3,412,528
PROCESS FOR THE PREPARATION OF HYDROFLUORIC ACID

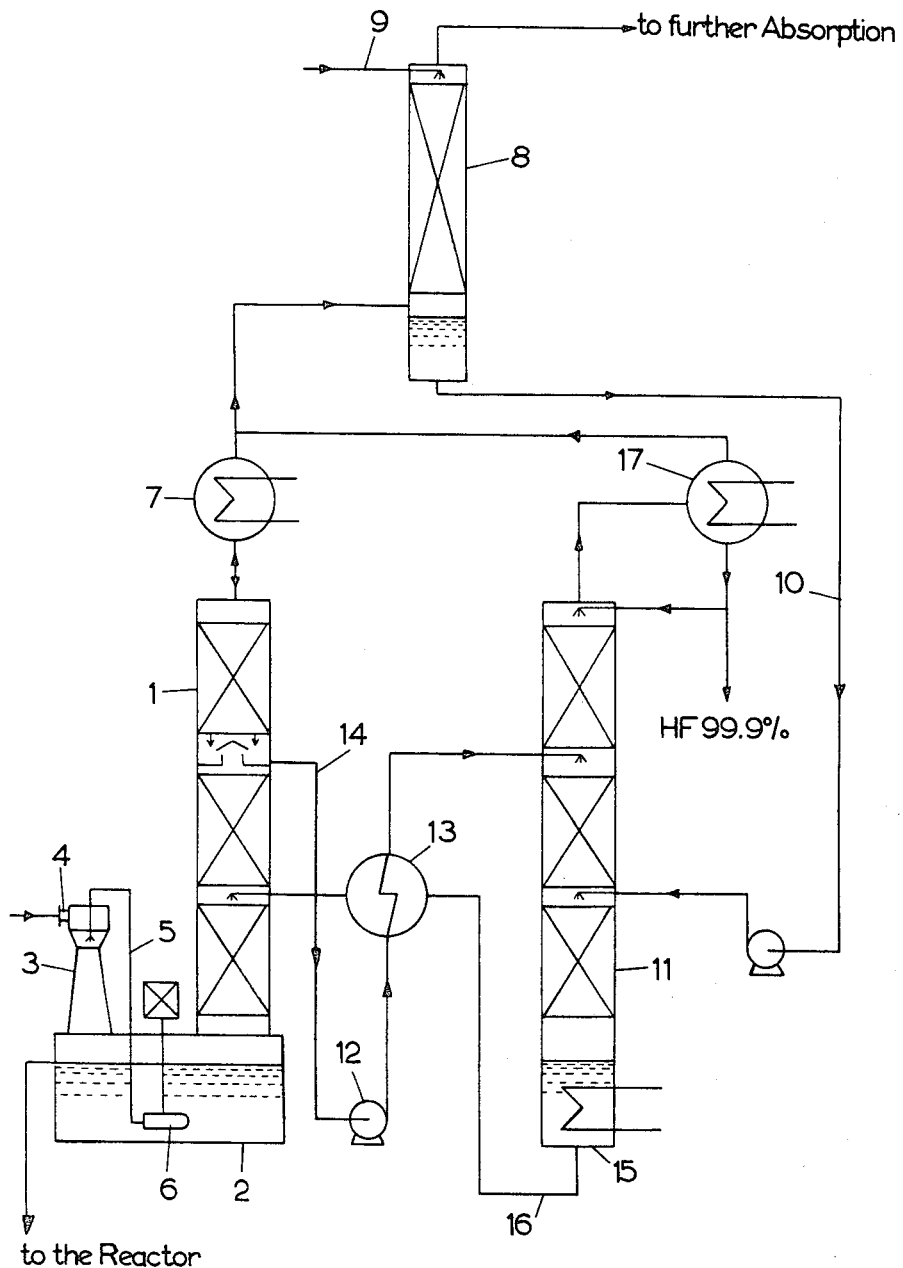

Albrecht Migule, Liestal, Franco Gaia, Pratelln, and Renato Gentili, Muttenz, Switzerland, assignors to Buss A.G.
Continuation-in-part of application Ser. No. 302,784, Aug. 19, 1963. This application Aug. 17, 1967, Ser. No. 661,475
Claims priority, application Germany, Aug. 20, 1962, B 68,501
10 Claims. (Cl. 55—71)

ABSTRACT OF THE DISCLOSURE

Process for the isolation of pure hydrofluoric acid from reaction gases, comprising removing solid particles from the gases and cooling said gases so that the proportion of high boiling components are condensed, the still hot gases ascending a first column in which heat exchange and rectification takes place, and then condensing the resulting purified crude hydrofluoric acid substantially free of low boiling components, which is then passed after being warmed in a heat exchanger into a second column operating under pressure, wherein the hydrofluoric acid is allowed to evaporate and any remaining high boiling components are washed out, and high purity hydrofluoric acid then being collected from a condenser at the end of the second column.

---

The present invention concerns a process for the prepraration of pure hydrofluoric acid from reaction gases, and is a continuation-in-part application from our application Ser. No. 302,784 dated Aug. 19, 1963 and now abandoned.

In known manner pure hydrofluoric acid is obtained by multi-stage distillation from crude acid. The disadvantages of this process consist in that the crude gas has to be condensed from the reaction apparatus and therewith a certain proportion of low-boiling and high-boiling components. Such a condensation may be effected only at low temperature, thus necessitating a costly cooling agent.

An object of the present invention is to provide a simple and cheap process in which the purest hydrofluoric acid may be obtained from the reaction gases.

According to the present invention a process for the isolation of pure hydrofluoric acid from reaction gases is characterized in that the reaction gases are first freed of solid particles in a washing device and at the same time cooled down to such an extent that a proportion of high boiling components are condensed, the still hot gases are then allowed to ascend a column with a lower section for a substance and heat exchanged with freshly introduced washing fluid, and an upper section for rectification followed by a cooled condenser, all resulting in a purified crude hydrofluoric acid substantially free of low boiling components which is passed warmed by an interposed heat exchanger into a second column operating under pressure, and where any remaining high-boiling components are washed-out with warm liquid and HF is freely allowed to evaporate, high purity hydrofluoric acid in quantity being collected from a condenser following the second column and low boiling components being allowed to pass the condensers on the first and second columns and being allowed to ascend to an absorption plant.

The apparatus for carrying out the process has a first and a second column and also a washing device arranged on a sump of the first column, the two columns communicating with one another and with an absorption plant.

The invention will now be described with reference to the drawing in which the single figure is an example of the apparatus schematically illustrated.

A first column 1, is provided with a sump 2 on which a washing device 3 e.g. in the form of a venturi scrubber, is mounted. The washing device has a supply pipe 4 for the reaction gases and a pipe 5 communicating with the sump 2, through which pipe the liquid collecting in the sump of the column is conducted by means of a pump 6 into the washing device 3. Column 1 communicates with an absorption plant 8 via a condenser 7, which plant has a supply pipe 9 for sulphuric acid and also a connecting pipe 10 which leads to a pressure column 11. The latter in turn communicates via a pump 12 and a heat exchanger 13 with the column 1 via a pipe 14. A heated sump 15 of column 11 is connected via a pipe 16 with the column 1, pipe 16 in turn leads via the heat exchanger 13. A condenser 17 is provided moreover, which is connected between the absorption plant 8 and the column 11.

The gases having a temperature of 100–200° C. and arriving from the reactor apparatus which are laden with $SiF_4$, $SO_2$, $H_2O$, $CO_2$ and solids, are first passed through the pipe 4 into the washing device 3. Intensive spraying with the liquid collected in sump 2 of column 1 and including sulphuric acid renders the solids laden with liquid and they are converted into agglomerates, which rebound against the liquid surface of the sump 2 and are deposited there. Additionally an intensive substance and heat exchange takes place in the washing device 3, so that the gases are cooled off and a major proportion of the high-boiling components are condensed.

The gases substantially freed of the solids and a proportion of the high-boiling components rise in the column 1, in which a further heat and substance exchange takes place with the fluid being returned from the sump 15 of column 11. This returned fluid from column 11 consists essentially of a mixture of 50–90 percent by weight HF with 10–50 percent by weight $H_2SO_4$ and some 1–2% by weight $H_2O$. The returned fluid is cooled down to 25–40° C. in the heat exchanger 13 before the fluid enters the lower section of column 1. Here the cooled fluid returned from sump 15 meets in counter current the washed but still warm reaction gases which partially desorb HF out of the fluid which in turn takes up heat leaving the lower part of this column section at a temperature of 70–100° C. The fluid is then used for the washing device 3 as already described above, but a portion is continuously drawn off the sump 2 and cycled back to the reactor. This portion consists of 10–20 percent by weight HF, 80–90 percent by weight $H_2SO_4$ and some 1–2% by weight $H_2O$, or a combination of these substances as a multi-component mix in chemical equilibrium.

The gases having previously been freed substantially of solids, and a proportion of the high-boiling components having now been enriched in HF, are cooled to approximately 30° C. in the lower section of column 1. The gases rise further to the upper part of this column 1 where rectification takes place. The rectification section of column 1 is followed by the condenser 7 operated so that a partial condensation of HF gases takes place and so that all low-boiling components with a certain quantity of gaseous HF arrive in the absorption plant 8. The composition of the gases entering plant 8 depends on the content of low-boiling components and on the cooling medium temperature in the preceding condenser 7 where water of ambient temperature or cooling brine are used for cooling.

Condensed hydrofluoric acid collecting in the upper section of column 1 and containing 1–2% by weight $H_2SO_4$, 1–2% $H_2O$ and traces only of the low boiling components is drawn off through pipe 14 and heat exchanger 13 with pump 12 and sprayed into column 11 which operates under a pressure of 0.5 to 10 atmospheres. Complete separation of gaseous HF from the high boiling components takes place in this column 11. The liquid collecting in the sump of column 11 is recycled via pipe 16 and heat exchanger 13 into the lower section of column 1. HF gas rising through column 11 is condensed in condenser 17 and can be drawn off now as HF-acid of high purity. Moreover, it is advantageous to bleed in compressed air or another non-reactive, non-condensable gas at the head of column 11 or the condenser 17.

The gases escaping from the condensers 7 and 17 arrive in the absorption plant 8, wherein the hydrofluoric acid still contained is absorbed by sulphuric acid, which is introduced through pipe 9 into the absorption plant. The sulphuric acid may be that used in the hydrofluoric acid producing reaction. In this manner a very costly condensation of the last HF residues from the crude gas as hitherto effected by refrigeration is saved. The absorption agent enriched with hydrofluoric acid is piped by line 10 to column 11, where some hydrofluoric acid is driven out by the heat in the column. Water possibly still freely contained in the plant may be combined by means of oleum with the surphuric acid. Residual gases after leaving plant 8 will still contain $SiF_4$, $SO_2$, $CO_2$, air and some HF, the gases are conducted into a water and/or alkaline absorption.

The invention will be further described in the following example:

Example

A mixture of gases from the reactor in a large plant tested with:

| | Percent by weight |
|---|---|
| HF | 80.0 |
| $HSO_3F$ | 10.0 |
| $H_2O$ | 3.5 |
| Remainder | 6.5 |
| Gas plus entrained solids | 100.0 | whereby the remainder contains the low-boiling components such as $SO_2$ and the non-condensing gases, such as air, $SiF_4$, and $CO_2$. The temperature of gases leaving the reactor was 150° C. The gases with the entrained solids were first conducted by line 4 into the scrubber 3. Solids are scrubbed out by intensive mixing with sprayed liquid collected from sump 2 of column 1. Scrubbing also partially cools the gases which then ascend in column 1 being brought into intimate contact with washing fluid coming down in countercurrent. Washing fluid was tested in percent by weight to HF, 74%; $H_2SO_4$, 25%, and $H_2O$, 1% after it had been cooled to approximately 25° C. before entering column 1. The ascending gases drive off the major part of the HF contained in the washing fluid by evaporation which by heat exchange with the gases rises in temperature to approximately 90° C. at the point when entering sump 2. The ascending gases cool down during this counter current action due to evaporation of HF and heating of the remaining liquid, in the lower section of column 1, and the major proportion of $HSO_3F$ and $H_2O$ was washed out of the gases.

A portion of the liquid accumulating in sump 2 was drawn off and tested in percent by weight HF, 3%; $HSO_3F$, 45%; $H_2SO_4$, 44% and $H_2O$, 8%.

Gases in column 1 ascend cooled from the lower section to the upper part where rectification takes place freeing the HF of lower boiling components. This HF acid is drawn off by pipe 14 and pump 12, and it passes through the heat exchanger 13, is warmed to 40° C., and is then injected into column 11, which operates under 2 atmospheres pressure. This once rectified crude HF acid tested in percent by weight HF, 96%; $H_2SO_4$, 2%; $H_2O$, 2% and only traces of low boiling components ($SO_2$ mostly). At the head of column 11 high purity HF acid was drawn off at 612.5 kilos/h. and tested in percent by weight: HF, 99.94%; $SO_2$, 0.005%; $H_2SiF_6$, 0.005% and $H_2O$, 0.01%.

Liquid accumulating in the sump of column 11 is recycled through line 16 to column 1 after first passing heat exchanger 13 and cooling down therein from approximately 50° C. to 25° C., to be used as washing fluid.

The gases escaping condensers 7 and 17, were tested at 14° C. to contain by weight: HF, 92%; remainder 8% containing non-condensing gases and low boiling components. The HF contained therein was absorbed in plant 8 with 98% conc. sulphuric acid piped in by line 9. The absorbent enriched with HF was then passed by line 10 into column 11 and tested by weight: HF, 45%; $H_2SO_4$, 54% and $H_2O$, 1%, all at approximately 40° C.

The residual gas after plant 8 tested HF, 28% and non-condensing gases plus low boiling components as the remainder.

The process of the invention also presents economic advantages due to the extensive and purposeful use of the heat content of the reaction gases being exchanged to the washing fluids and also substantial reduction of any required external cooling.

Furthermore the process makes advantageous use of the crude processed medium as constituent of washing fluids employed at the various stages, and as detailed in the subsequent claims.

We claim:

1. A process for the isolation of pure hydrofluoric acid from recation gases, characterized in that the reaction gases are first freed of solid particles in a washing device and at the same time cooled down to such an extent that a proportion of high boiling components are condensed, the still hot gases are then allowed to ascend a column with a lower section for a substance and heat exchanged with freshly introduced washing fluid, and an upper section for rectification followed by a cooled condenser, all resulting in a purified crude hydrofluoric acid substantially free of low boiling components which is passed warmed by an interposed heat exchanger into a second column operating under pressure, and where any remaining high-boiling components are washed out with warm liquid and HF is freely allowed to evaporate, high purity hydrofluoric acid in quantity being collected from a condenser following the second column and low boiling components being allowed to pass the condensers on the first and second columns and being allowed to ascend to an absorption plant.

2. A process as claimed in claim 1, in which the liquid collecting hot in the sump of the washing section of the first column is used subsequently in the washing device for the still hotter gases arriving from the reaction.

3. A process as claimed in claim 1, in which the fresh washing fluid introduced into the first column is a mixture of the washing fluid collected in the sump of the second column previously cooled in a heat exchanger and then being depleted of contained HF by evaporation through the hot gases ascending in the first column thereby also cooling these gases, which are also freed of a further part of high boiling components by the washing fluid.

4. A process as claimed in claim 1, in which crude hydrofluoric acid from the head of the first column is passed as washing fluid into the second column after being warmed in a heat exchanger, where it served as coolant, and furthermore where the second column receives as additional fresh warm washing fluid the absorption agent having been enriched in HF in the absorption plant, and where in this second column part of the HF is allowed freely to evaporate out of the warm washing fluids and to be condensed in quantity as high purity HF with some warm HF gas containing any remaining low boiling components to pass over without condensation to a subsequent absorption plant.

5. A process as claimed in claim 1, in which sulphuric acid is used as the fresh absorption agent in the absorption plant and is then cycled through the second and first column and the washing device for incoming hot reaction gas taking up heat before being passed to the reaction apparatus.

6. A process as claimed in claim 1, in which a non-reactive non-condensable gas is supplied to the head of the second column.

7. A process as claimed in claim 1 in which the operation in the second column is carried out at a pressure of 0.5–10 atmospheres.

8. A process as claimed in claim 1 in which transfer of the washing fluid is assisted by pumps and also to boost delivery pressure for injection or spraying into a column.

9. A process as claimed in claim 1, in which additional heat is provided by heating of the washing fluid in the sump of the second column and where water at ambient temperature or cooling brine are used for cooling.

10. A process as claimed in claim 1 carried out in an installation having a first and a second column, a sump provided on the first column and a washing device arranged on the sump, an absorption plant in communication, with both said columns and a condenser being connected to and between one of said columns and the absorption plant, a pipe constituting a further connection between said columns, a heat exchanger through which said pipe leads and a pump provided in said pipe, an additional communication being provided by connection of said sump of the second column to the first column, said additional communication leading through the heat exchanger.

References Cited

UNITED STATES PATENTS

| | | | |
|---|---|---|---|
| 2,456,509 | 12/1948 | Hopkins et al. | 55—71 |
| 2,952,334 | 9/1960 | Provoost et al. | 55—71 |
| 3,008,807 | 11/1961 | Hilgert et al. | 55—223 |

FOREIGN PATENTS 387,614  2/1933  Great Britain.

REUBEN FRIEDMAN, *Primary Examiner.*

C. N. HART, *Assistant Examiner.*